June 4, 1940. P. KRAUSE 2,203,573
GLASS ARTICLE BOTTOMER
Filed Feb. 18, 1937 4 Sheets-Sheet 1

Inventor
Paul Krause
By L. F. Randolph
Attorney

Inventor
Paul Krause
By L. F. Randolph
Attorney

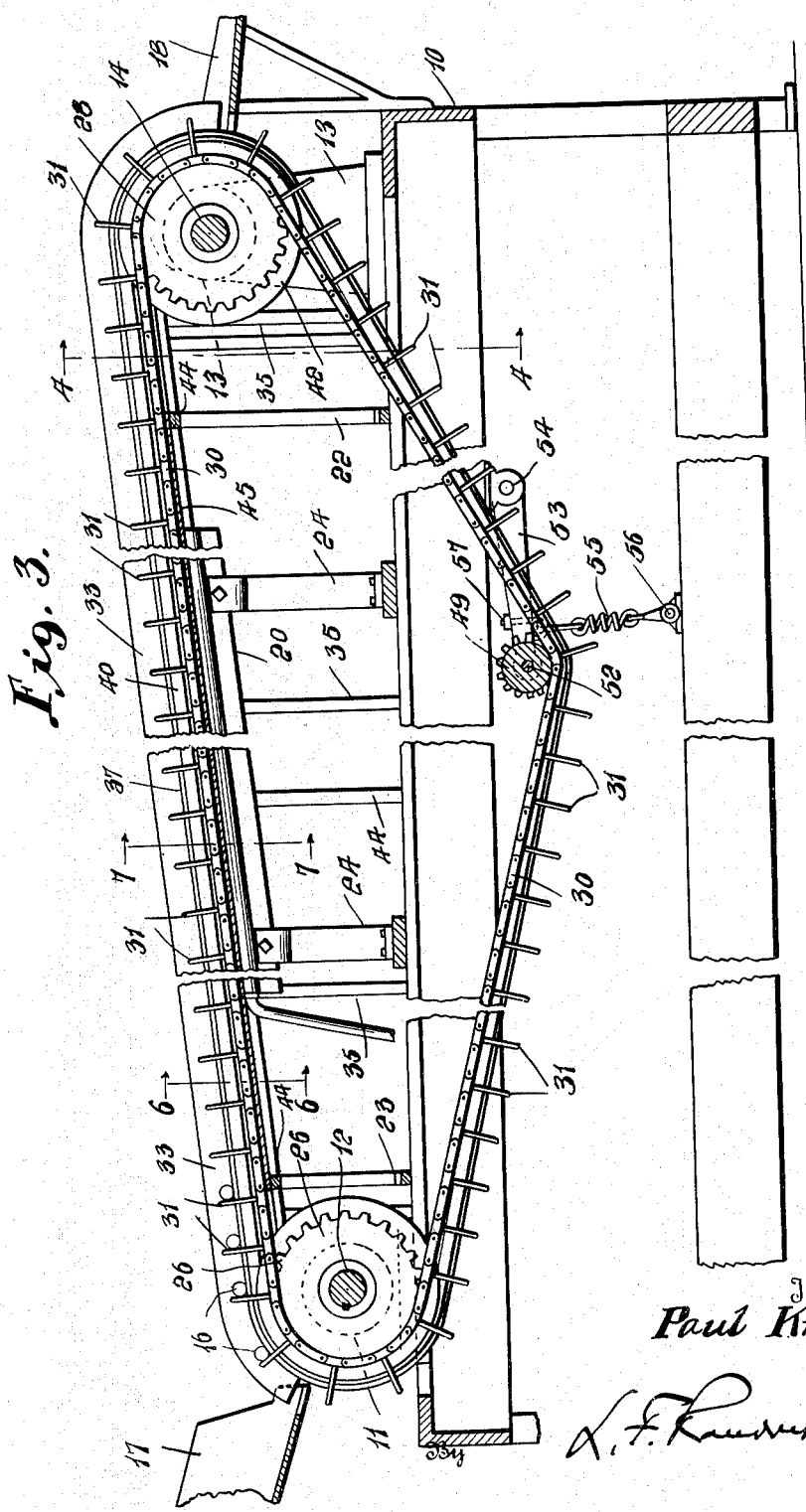

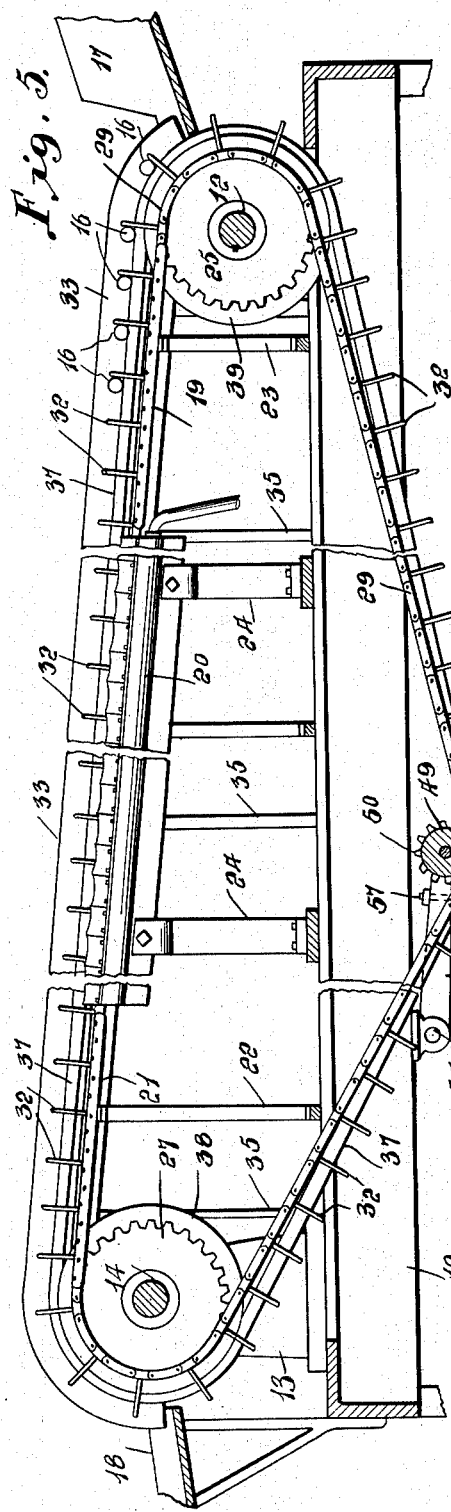

Patented June 4, 1940

2,203,573

UNITED STATES PATENT OFFICE 2,203,573

GLASS ARTICLE BOTTOMER

Paul Krause, Franklinville, N. J., assignor to Hudson Armstrong, Salem, N. J.

Application February 18, 1937, Serial No. 126,473

5 Claims. (Cl. 49—7)

This invention relates to a bottomer for glass articles or machine wherein a glass tube is divided intermediate its ends and the ends closed adjacent the division in order to provide bottles, vials, test tubes and the equivalent.

It is particularly aimed to provide a machine wherein the production will be greater and the work more efficient because of a continuous straight travel of the articles or ware.

It is also aimed to provide a novel means embodying co-acting conveyor elements to move the tubes through the heating means and to spin or rotate the tubes as they are moved through the heating means in order to effect the division or separation of the tube and the closure of the adjacent ends of the divided portions.

The more specific objects and advantages will become apparent from a consideration of the description following taken in connection with accompanying drawings illustrating an operative embodiment.

In said drawings:

Figure 3 is a sectional view taken on the line 3—3 of Figure 1;

Figure 5 is a sectional view taken on the line 5—5 of Figure 1;

Figure 6 is an enlarged cross sectional view taken on the line 6—6 of Figure 3, and Figure 7 is an enlarged cross sectional view taken on the line 7—7 of Figure 3.

Figure 1:
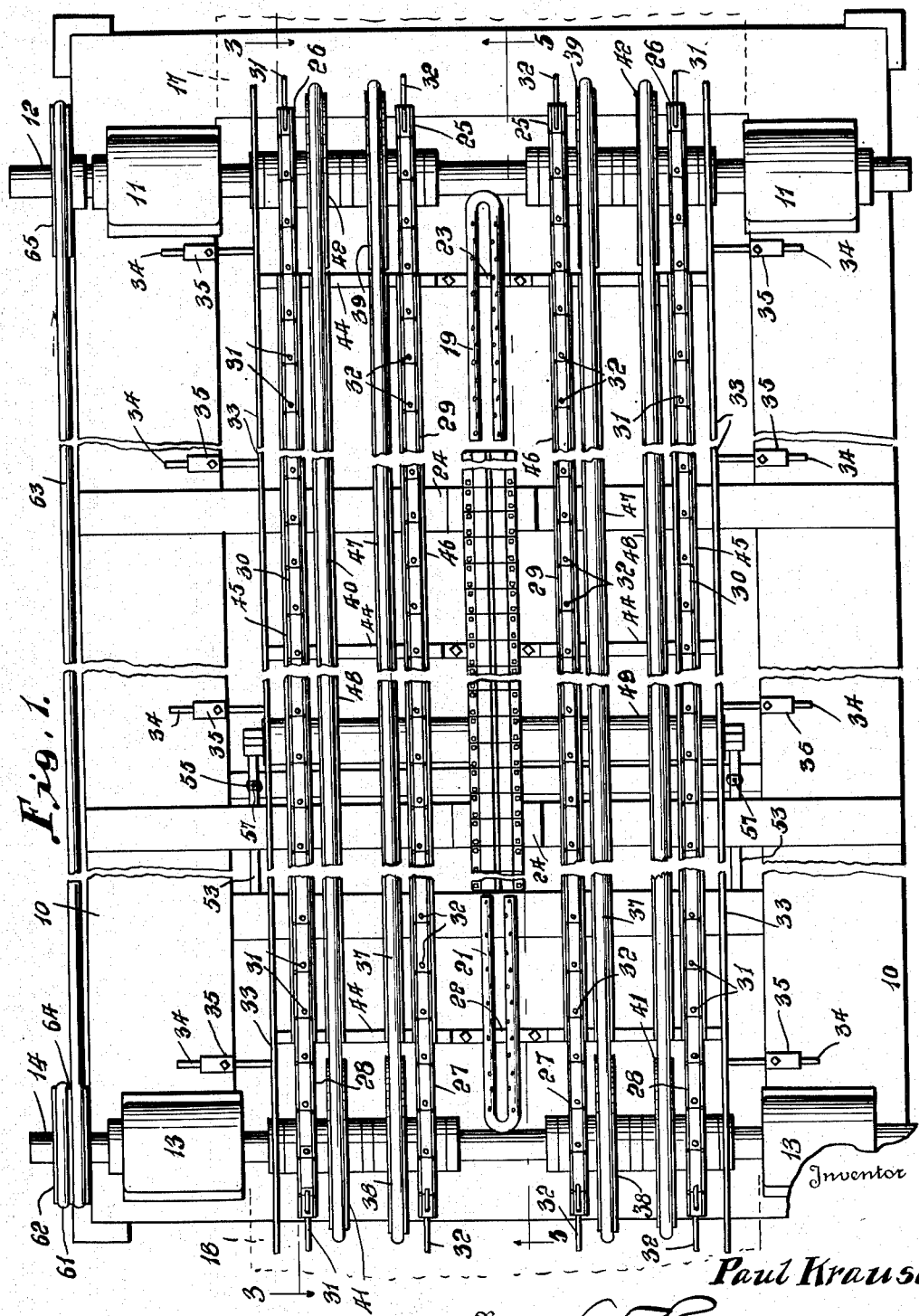
Figure 1 is a view in plan of the improved machine.
Figure 2:
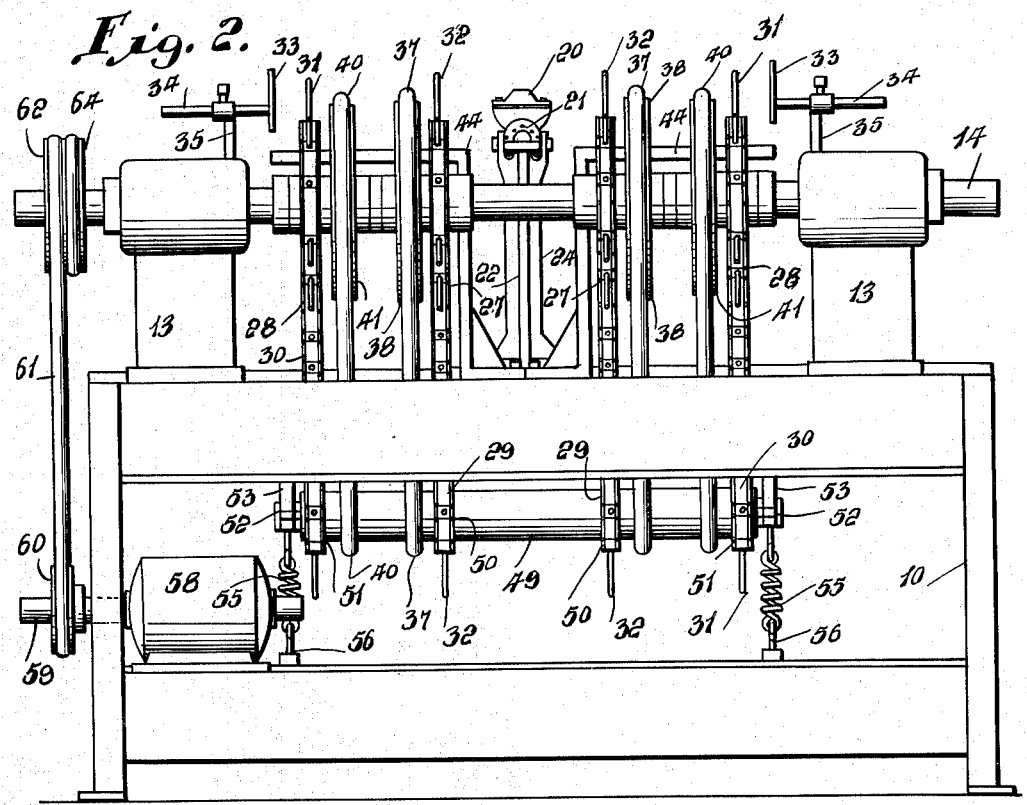
Figure 2 is an end elevation of the machine looking from the left of Figure 1.

Referring specifically to the drawings wherein like reference characters designate like or similar parts, the invention utilizes a suitable framework as at 10 having bearings thereon as at 11, at one end of the machine, in which a shaft 12 is journaled. At the other end of the machine, bearings 13 are provided in which a shaft 14 is journaled, such shaft 14 preferably being higher than the shaft 12.

The glass tubes from which the ware is to be manufactured, are shown at 16, being supplied by a hopper 17, which inclines as shown in Figures 3 and 5 so as to discharge the tubes by gravity. The ware is discharged from the machine onto a trough or the equivalent 18, which is suitably fastened to the framework 10.

Disposed centrally and longitudinally of the frame is a preheating burner 19, a severing burner 20, and a tempering burner 21. Burners 19 and 21 heat the glass to a materially less degree than the burner 20. All of such burners preferably use gas as fuel and they may be supported by means of brackets 22, 23 and 24, respectively, on the framework 10.

On each side of the aforesaid burners, and keyed to the shaft 12 are sprocket wheels 25 and 26. Sprocket wheels respectively aligned longitudinally therewith as at 27 and 28, are loose on the shaft 14. Flexible endless belts or conveyors 29 traverse the sprocket wheels 25 and 27 and flexible endless belts 30 traverse the sprocket wheels 26 and 28. Equidistantly spaced projections or pins 31 and 32 project outwardly from the belts 29 and 30, respectively. The glass tubes 16 are adapted to roll from the hopper 17 against the belts 29 and 30 between adjacent projections 32 and to be moved by the same over the burners 19 and 20 successively, each glass tube, as shown in Figures 6 and 7, being of a length to extend across all of the conveyors 29 and 30, at the same time. Said tubes pass between upright longitudinally disposed guard plates 33 adjacent the sides of the machine, which are preferably laterally adjustable by means of rods 34, adjustably secured in brackets 35 suitably mounted on the framework 10.

As the glass tubes 16 roll from the hopper 17 onto the conveyors 29 and 30, they also engage endless flexible conveyors 37 which are trained over pulleys 38 keyed to the shaft 14 and over pulleys 39 loose on shaft 12. Endless flexible conveyors 40 of slightly less length than the conveyors 37, traverse pulleys 41 and 42 keyed to and loose on the shafts 14 and 12, respectively, the pulleys 41 and 42 preferably being of slightly less diameter than the pulleys 38 and 39, so that the upper runs of the conveyors 40 will be slightly lower than the upper runs of the conveyors 37.

Suitable brackets are provided on the framework 10 as at 44 in order to mount the bars 45, 46, 47 and 48, on which the upper runs of the conveyors 30, 29, 37 and 40 rest and travel, the bars serving to prevent sagging thereof. All of said bars are preferably grooved in their upper surfaces as shown, to better receive the conveyors.

The conveyors 37 and 40 are trained around a shaft or drum 49 which has sprocket wheels 50 and 51 keyed thereto and over which the conveyor chains 29 and 30 pass. Said roller or shaft 49 has trunnions 52 by means of which it is journaled in arms 53 pivoted at 54 to the framework 10. Contractile coil springs 55 are secured at 56 to the framework 10 and to hooks 57 on the arms 53, whereby the springs tend to pull the arms 53 downwardly and accordingly the shaft 49 downwardly in order to tension and take up any slack in the various conveyors trained thereover.

The power for operating the machine may be supplied by an electric motor 58 although obviously any equivalent may be substituted. Such motor 58 has a main shaft 59 provided with a pulley 60 over which an endless belt 61 is trained and which also traverses a pulley 62 on the shaft 14. Shaft 12 is driven from and preferably slower than the shaft 14 inasmuch as an endless belt 63 traverses pulleys 64 and 65, keyed to the said shafts 14 and 12, respectively.

Attention is called to the fact that the conveyors 37 and 40 are preferably spring belts and such belt 37 travels twice as fast as the conveyors 29 and 30, so that the glass tubes 16, in addition to being conveyed by the conveyors 29 and 30, are also spun or rotated on horizontal axes while they are being conveyed and especially while they are travelling over burners 19 and 20. The projections 32 are preferably set slightly farther back than the projections 31 so as to cause the tubes to separate, in combination with the burner 20 and each half of the tube to shift toward the respective stop or guard 33. Since the upper runs of the different conveyors are upwardly and rearwardly inclined as in Figures 3 and 5, they better keep the glass tubes and the ware in contact with the separating pins or projections 31 and 32.

Figure 4:
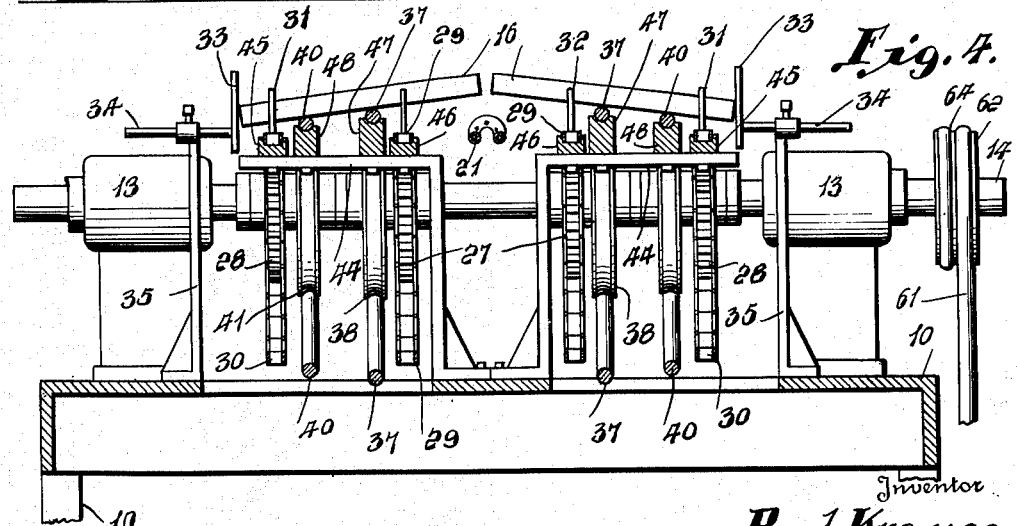
Figure 4 is a sectional view taken on the line 4—4 of Figure 3.

Presuming operation of the machine, the various conveyors are operated from the motor 58, through the gearing, from right (Figure 3) to left, Figure 1. Glass tubes 16, open at each end, travel by gravity from the hopper 17 into contact with the conveyors 29 and 30, and they are moved away from the hopper by the engagement therewith of adjacent projections 31 and 32. The central portions of such tubes pass over the heater 19 which serves to preheat the tubes to minimize danger of fracture thereof. As the tubes 16 are so advanced, because the conveyors 37 and 40 travel twice as fast as the conveyors 29 and 30, the glass tubes in addition to the travelling movement are also spinning or rotated on a horizontal axis so that they will be more evenly heated as they pass over the heater 19 and so that the action of spinning, when they pass over the more intense flame from the burner 20, will close the tube midway of its ends and fracture the tube into separate portions, each having a closed end, as suggested in Figure 4 and by the dotted lines in Figure 7. Since the conveyors 40 have their upper runs lower than the conveyors 37, the tubes will drop onto the same or incline as shown in dotted lines in Figure 7, facilitating sliding toward the guards 33 and away from the flame, although adjacent the heater 21, which serves to temper the severed portions of the tube in order to prevent too rapid cooling thereof. It will also be realized that when the tubes are burned in half by the flame from the burner 20, the separation of the portions of the tube is facilitated by the fact that the projections 32 are set back slightly farther than the companion projections 31.

Various changes may be resorted to provided they fall within the spirit and scope of the invention.

I claim as my invention:

1. In a machine of the class described, a burner, means to convey a glass tube to said burner, an element having a tube-engaging run for spinning the glass tube while conveyed and moving over the burner in order to separate the tube into sections each having a closed end, means for spinning each severed section of the tube, the last mentioned means being continuously moving and having a section-engaging run at a lower level than the tube-engaging run of the first mentioned means for supporting engagement with the severed sections of the tube.

2. In a machine of the class described, a burner, means to convey a glass tube to said burner, an element having a tube-engaging run for spinning the glass tube while conveyed and moving over the burner in order to separate the tube into sections each having a closed end, means for spinning each severed section of the tube, the last mentioned means being continuously moving and having a section-engaging run at a lower level than the tube-engaging run of the first mentioned means for engagement by the severed portions of the tube, and control members between which the tubes travel and toward which the sections move after severance of the tube and means mounting the control members.

3. In a machine of the class described, a burner, means to convey a glass tube to said burner, two pairs of parallel belts, one belt of each pair being constructed and arranged with a tube-engaging run for spinning the glass tube while conveyed and moving over the burner in order to separate the tube into sections each having a closed end, the other belt of each pair having a tube-engaging run at a lower level than the tube-engaging run of the other belts for engagement by the severed sections of the tube, control members between which the tubes travel and toward which the sections move after severance of the tube into sections, means mounting the control members, and means driving the first mentioned means.

4. In a machine of the class described, a burner, means to convey a glass tube to said burner, two pairs of parallel belts, one belt of each pair being constructed and arranged with a tube-engaging run for spinning the glass tube while conveyed and moving over the burner in order to separate the tube into sections each having a closed end, the other belt of each pair having a tube-engaging run at a lower level than the tube-engaging run of the other belts for engagement by the severed sections of the tube, said means to convey comprising a plurality of conveyors, tube-separating pins on the conveyors, the pins of one conveyor of each pair being set farther back than the pins of the other conveyor of each pair.

5. In a machine of the class described, a burner, means to convey a glass tube to the burner, an element for spinning the glass tube while supported by the said means and subjected to the action of the burner to sever the tube, and an element for spinning each severed portion of the tube after severance by said burner, said means to convey consisting of a pair of conveyors, tube-separating pins on the conveyors, the pins of one conveyor being set farther back than the pins of the other conveyor.

PAUL KRAUSE.